United States Patent [19]
Sévigny

[11] Patent Number: 5,786,824
[45] Date of Patent: Jul. 28, 1998

[54] PROCESSING IMAGE DATA

[75] Inventor: Benoît Sévigny, Montreal, Canada

[73] Assignee: Discreet Logic Inc., Montreal, Canada

[21] Appl. No.: 630,131

[22] Filed: Apr. 10, 1996

[51] Int. Cl.$^6$ ........................................... G06F 15/00
[52] U.S. Cl. ................................................ 345/438
[58] Field of Search .......................... 395/138, 135; 345/435, 438, 113, 114, 118, 121

[56] References Cited

U.S. PATENT DOCUMENTS

| | | | |
|---|---|---|---|
| 4,524,421 | 6/1985 | Searby et al. | 364/521 |
| 4,538,188 | 8/1985 | Barker et al. | 360/14.3 |
| 4,558,302 | 12/1985 | Welch | 340/347 DD |
| 4,602,286 | 7/1986 | Kellar et al. | 358/183 |
| 4,641,255 | 2/1987 | Hohmann | 364/522 |
| 4,823,108 | 4/1989 | Pope | 340/721 |
| 5,077,610 | 12/1991 | Searby et al | 358/183 |
| 5,212,544 | 5/1993 | Kellar et al. | 358/22 |
| 5,216,755 | 6/1993 | Walker et al. | 395/132 |
| 5,289,566 | 2/1994 | Walker et al. | 395/132 |
| 5,359,430 | 10/1994 | Zhang | 358/455 |
| 5,384,667 | 1/1995 | Beckwith | 360/33.1 |
| 5,398,120 | 3/1995 | Friedman et al. | 358/501 |
| 5,428,723 | 6/1995 | Ainscow et al. | 395/135 |
| 5,430,878 | 7/1995 | Straub et al. | 395/700 |
| 5,434,958 | 7/1995 | Surma et al. | 395/135 |
| 5,442,751 | 8/1995 | Patrick et al. | 395/250 |
| 5,455,600 | 10/1995 | Friedman et al. | 345/153 |
| 5,459,529 | 10/1995 | Searby et al. | 348/586 |

FOREIGN PATENT DOCUMENTS

| | | |
|---|---|---|
| 2066989 | 10/1992 | Canada . |
| 0 360 599 A2 | 3/1990 | European Pat. Off. . |

*Primary Examiner*—Phu K. Nguyen
*Attorney, Agent, or Firm*—Goudreau Gage Dubuc & Martineau Walker

[57] ABSTRACT

The present invention relates to a method and apparatus for removing unwanted movements in digitized image caused by unsuitable camera mountings or recordings made under difficult conditions. The image data is processed by tracking a selected image portion over a plurality of frames. The position of the image within its frame is adjusted so that the position of the selected image portion remains substantially constant frame after frame, and modifications to the image are made. Portions of the images that extend beyond frame edges are repositioned within the frame edge. The position of the image within its frame is then reset to its original position, so that the modified image moves as if it were part of an original shot.

8 Claims, 7 Drawing Sheets

PROCESSING IMAGE DATA

FIELD OF THE INVENTION

The present invention relates to processing image data, wherein a plurality of digitized images are replayable as a video clip.

BACKGROUND OF THE INVENTION

Advances in the field of digital signal processing have allowed many new developments to be effected in video and film post production. Many sophisticated image modifications and special effects have become widely accepted as part of a post production procedures as a result of the development of such products as "FLAME" and "FLINT", manufactured by the present Assignee.

Often, post production techniques are used to overcome limitations in original video or film footage. A limitation of this type occurs when undesirable movement has taken place within an image frame, possibly due to unsuitable camera mountings or due to recordings being made under difficult conditions, such as, where moving objects are involved. In some circumstances, movement of this type is desirable and is fully acceptable as part of the completed result. However, the inclusion of movement of this type may influence the effectiveness of other post production procedures, possibly making them more time-consuming or even unavailable for the clip concerned.

In order to overcome some of these problems, techniques have been developed for tracking portions of an image such that, in response to a successful track on a frame-by-frame basis, it is possible to apply modifications such that an unstable frame may effectively be "re-stabilized" so as to remove the apparent movement of the image within the image frame. However, a problem with this approach is that movement of the image frame with respect to its boundary will often result in image data being lost such that the procedure has limited use.

SUMMARY OF THE INVENTION

According to an aspect of the present invention, there is provided a method of processing of image data, wherein a plurality of digitized images are replayable as a video clip, comprising the steps of:

tracking a selected image portion on a frame-by-frame by frame boundary so as to maintain the position of said portions substantially constant within said frames;

effecting a modification to a second portion of said image; and readjusting the position of said image within the image frame.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Preferred embodiments of the invention will now be described by way of example only with reference to the accompanying drawings identified above.

Figure 1:
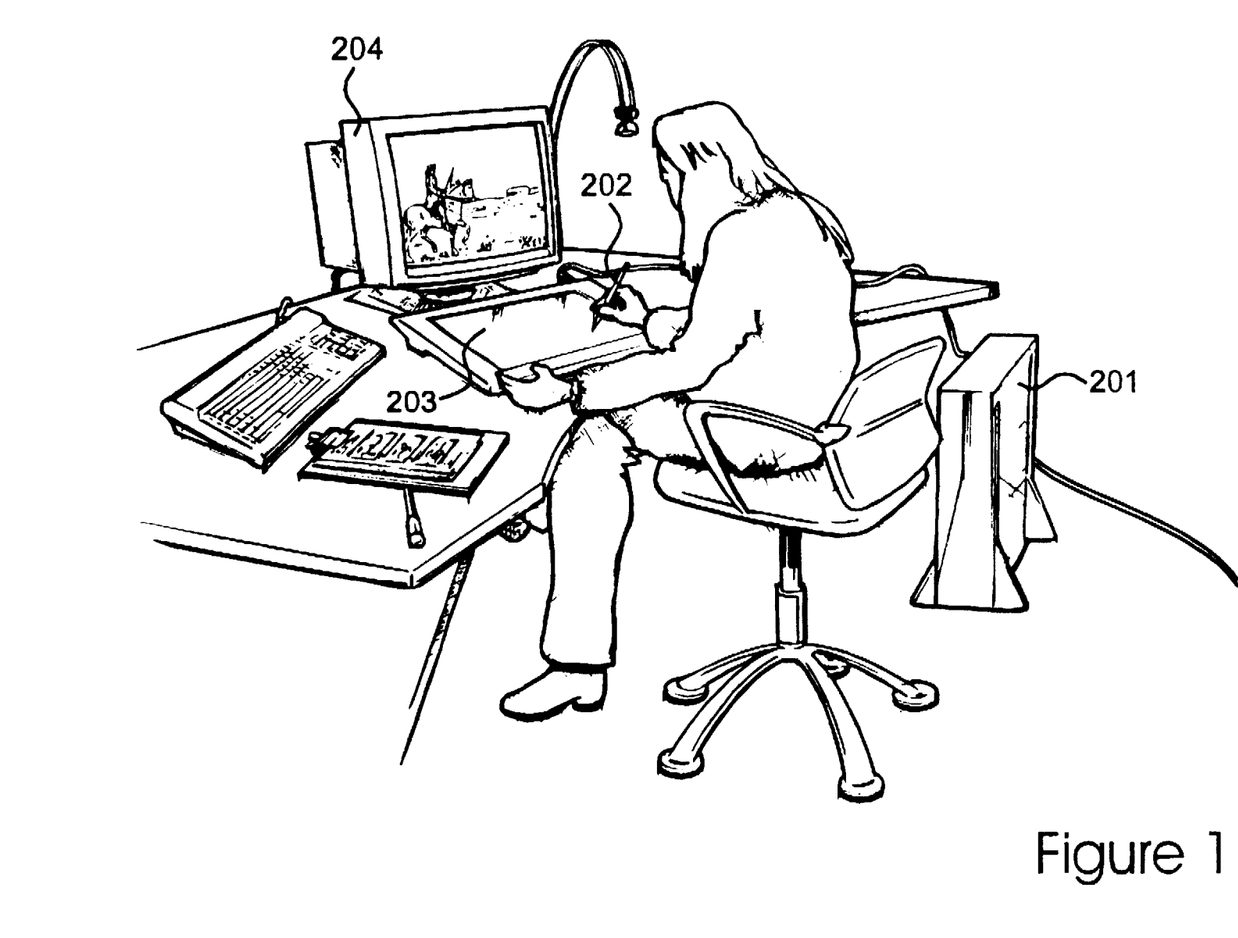
FIG. 1 illustrates a post production facility, including a storage device for video clips, a processing device and a display device for displaying images.

A post production facility is shown in FIG. 1, in which video clips are processed in a processing device 201. The processing of image clips is controlled in response to manual operation of a stylus 202 against a graphics touch tablet 203. Image clips are displayed to a video artist via a display unit 204.

In the present example, image data has been supplied to the processing environment 205, by scanning cinematographic film, such that said images may now be manipulated as digital image data. A desert scene is shown and the video artist is required to insert a cactus within the scene which should remain stationary on a frame-by-frame basis. However, although the camera should have remained stationary, movement has occurred such that the image does not remain stationary within its notional image frame. The artist is therefore presented with a problem in that, although there is a requirement for a new object to be inserted which remains stationary relative to a stationary background, the background is not actually stationary within the clip. Therefore, in accordance with conventional techniques, it would be necessary to reposition the object on a frame-by-frame basis.

Figure 2:
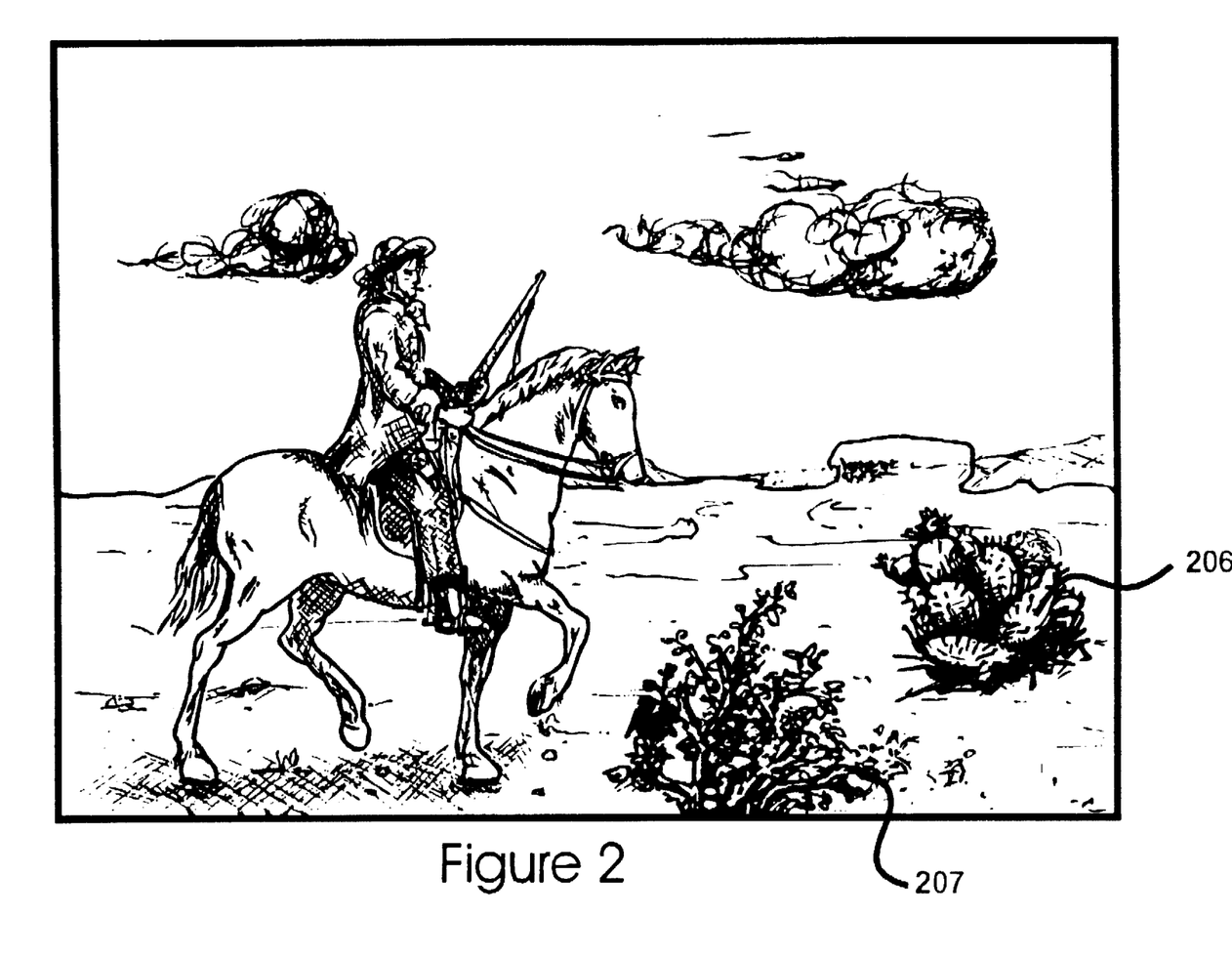
FIG. 2 illustrates an image of the type displayed on the display device shown in FIG. 1.

The image is illustrated further in FIG. 2. The cactus image portion 206 is not part of the original image and is required to be added thereto. The surrounding shrubbery image 207 is part of the original image and as such should not move on a frame-by-frame basis relative to the outside image frame. The artist is therefore effectively required to insert the cactus image 206 at a position which remains relatively constant to that of the surrounding shrubbery 207.

In accordance with the present embodiment, the artist is able to identify a selected image portion, preferably at a clearly defined edge or pixel transition within the region of the shrubbery 207. This selected image portion is then tracked on a frame-by-frame basis, thereby allowing the position of the image to be adjusted within its frame boundary so as to maintain said position substantially constant within the frame. Once such a manipulation has been made, it is possible to effect a modification to a second portion of the image which, in the present example, consists of the insertion of the cactus image 206. Thereafter, once the whole image has been modified so as to include the cactus image 206, a readjustment is made to the position of the image frame so as to replace the image back to its original location. However, when this readjustment is made, the cactus has been re-positioned within the image such that, as motion occurs with respect of the image frame, the cactus will move with this motion and therefore appear to be part of the original image.

Figure 3:
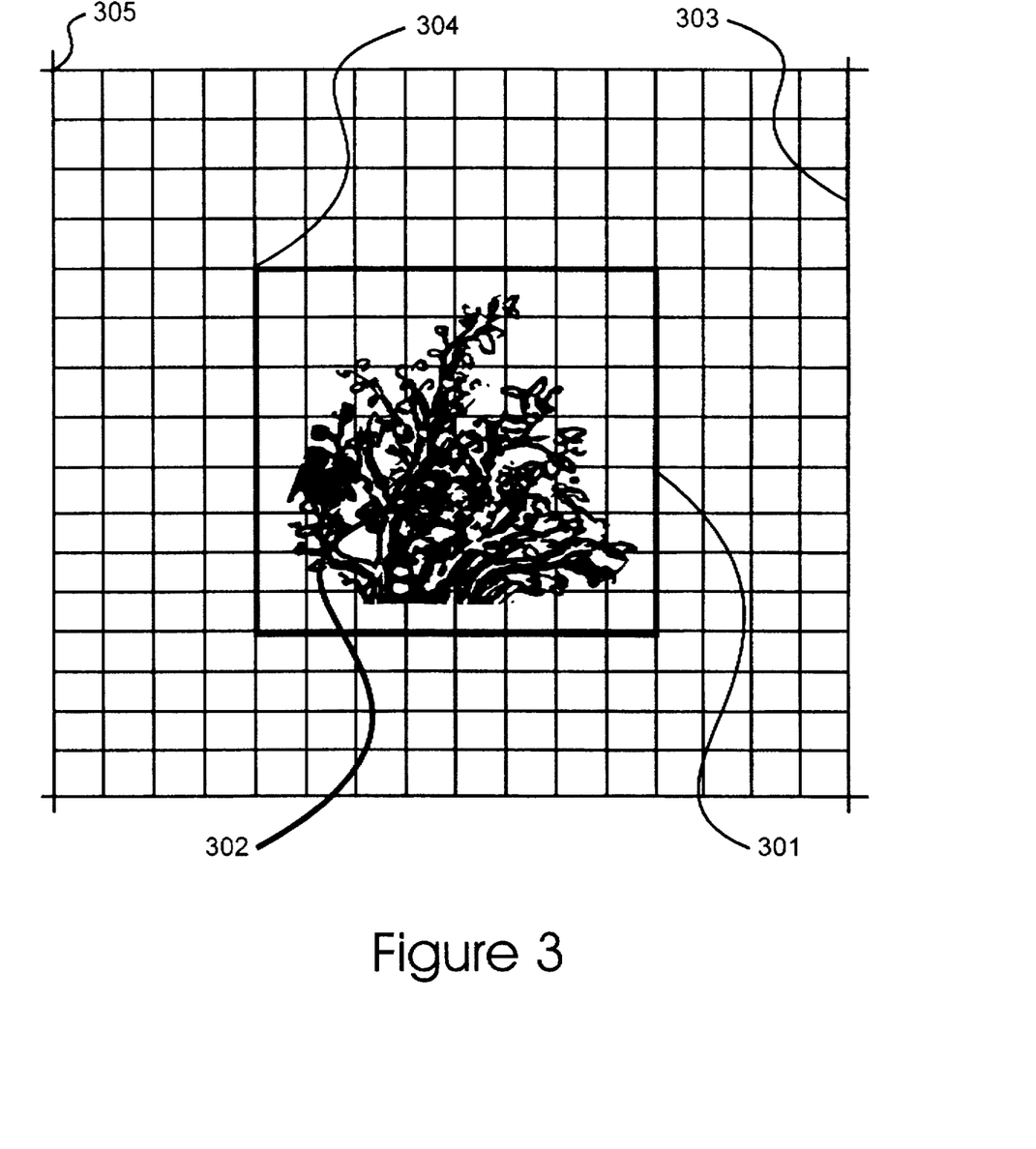
FIG. 3 shows an enlargement of an important part of the image shown in FIG. 2, to illustrate a tracking operation.

The tracking operation is effected by identifying a particular region within the image frame. FIG. 3 shows an enlarged portion within the region of the shrubbery 207. In response to making an appropriate selection from a displayed menu, a tracking box 301 is displayed which is located, in response to operation of the stylus 202, over a position within the image where a distinct transition occurs. This is identified in FIG. 3 by image 302 located within box 301.

On initiating the tracking procedure, values within box 301 are retained in memory such that on the next frame, comparisons can be made to determine how image 302 has moved within the frame. Box 301 in this example consists of an array of 8×8 pixels and is considered as being centrally located within a search area of 16×16 pixels 303. Thus, the first pixel of box 301 may be identified as 304 and the first pixel of box 303 may be identified as 305.

After storing pixel data for the first frame, consisting of box 301 for the first frame, box 301 of the first frame is compared against box 303 of the next frame. Pixel position 304 is compared with pixel position 305 and for each pixel location within box 301 a comparison is made between equivalent pixel locations. Thus, the value of pixel 304 will be compared with the value of pixel 305. Similarly, all other equivalent pixels within the 8×8 box will be compared with their equivalent locations within box 303.

Once these comparison values have been calculated, box 301 is advanced one pixel position to the left. A similar comparison is then made resulting in a further 8×8 pixel difference values being calculated. The procedure is then repeated, with a further movement to the left and so on until box 301 has been located at all possible positions within box 303 and comparison values have been calculated for all corresponding pixel locations.

The comparison values for each possible location of box 301 within region 303 are compared and as a result of this comparison it is possible to determine a best match for box 301 of the first frame with all possible positions within box 303 of the second frame. The best possible match is then assumed to be a result of object 302 moving within the frame and, from this information, it is possible to deduce a movement vector. A movement vector is stored and the procedure is repeated for the next frame within the clip. Thus, as a result of the movement vector calculated when comparing box 301 with region 303, it is possible to relocate box 301 within the second frame of the clip. This re-positioned box 301 is then considered against a similar surrounding region 303 of the third frame. Here it should be noted that box 301 and region 303 are both relocated in response to the movement vector from the previous comparison. Thus, for each frame transition, it is possible to calculate a movement vector so as to effectively track image 302 throughout the entire clip.

Having produced a set of vectors which allow an image to be tracked, these vectors are applied to the whole image with respect to the image frame. Thus, the resulting transformation provides image stabilization in that previously moving objects now appear stationary with respect to the image frame. This allows modifications to be made such that a modification procedure may be re-used on a frame-by-frame basis without requiring compensation for the undesirable movement. Thereafter, when the image frame has been modified, the stabilization is removed such that the modified region moves coherently with the rest of the moving image.

Figure 4:
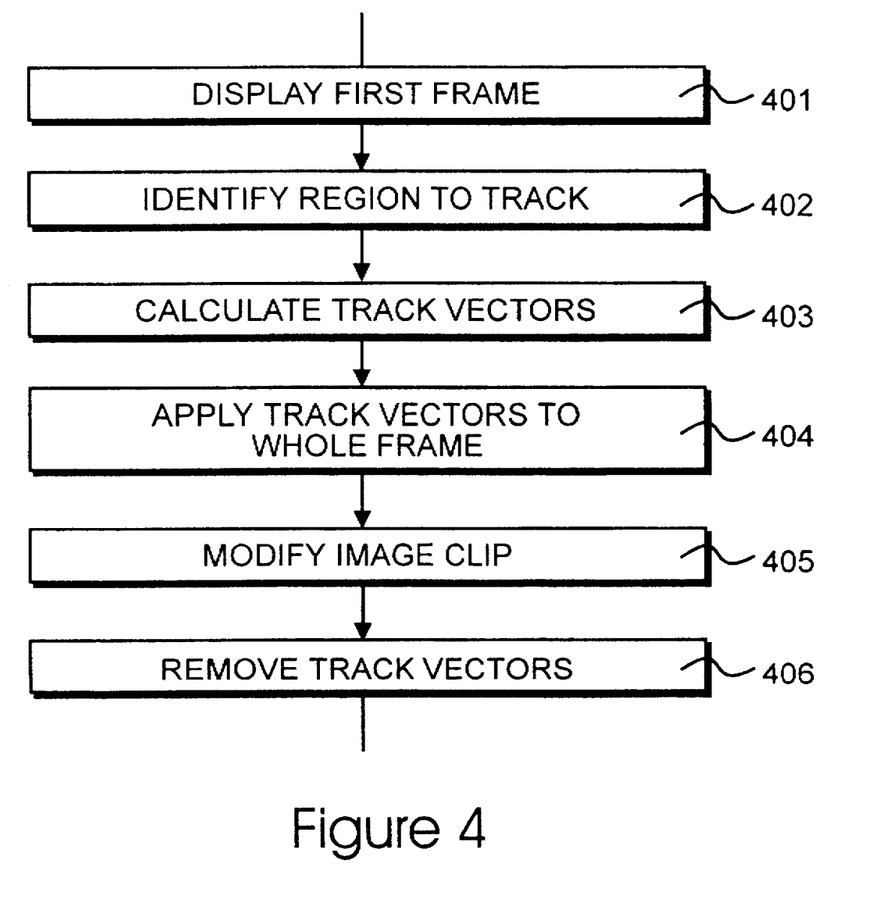
FIG. 4 shows a procedure for modifying an image, including a step for calculating track vectors.

Procedures involved for implementing this process are illustrated in FIG. 4. At step 401, a first image frame is displayed and at step 402, a tracking region is identified. Once the tracking region has been identified, in response to manual operation, tracking vectors are calculated at step 403, these vectors being required in order to maintain the identified region stationary within the image frame.

At step 404, the tracking vectors calculated at step 403 are applied to the frame as a whole, resulting in the image within the frame remaining substantially stationary with respect to the frame boundary.

At step 405, modifications are made to the image in response to manual operations whereafter at step 406, the tracking vectors are removed such that the modified portion of the image now moves coherently with the rest of the image frame.

Figure 5:
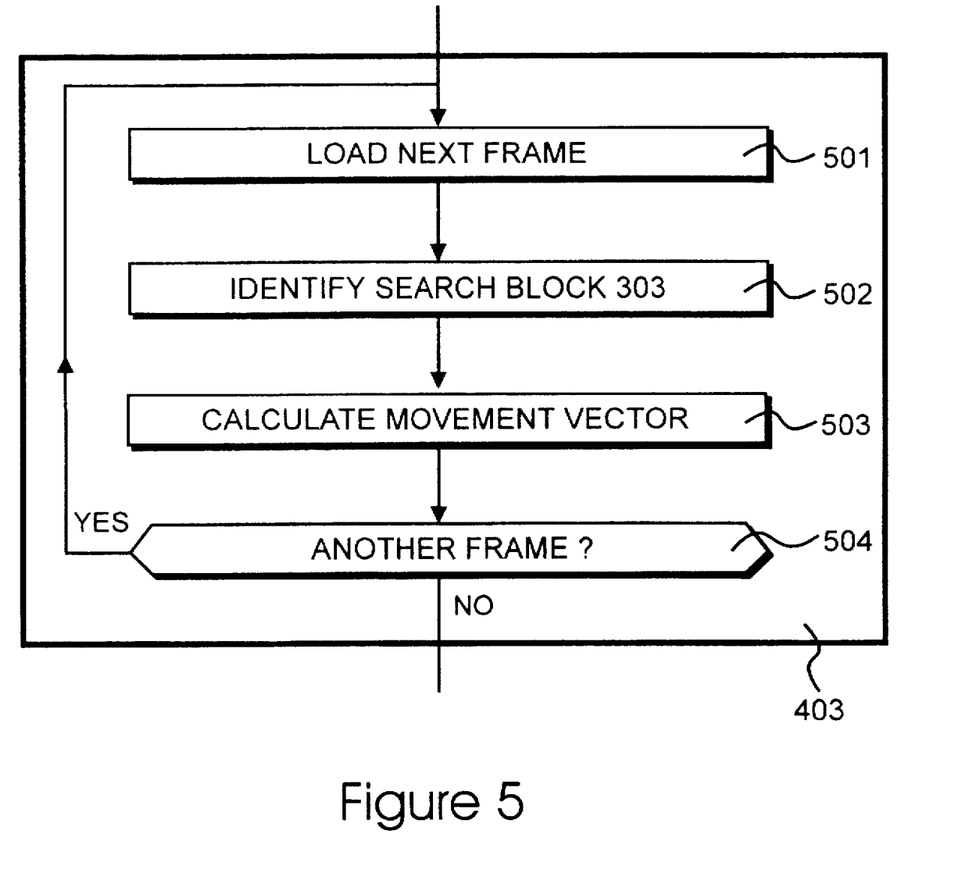
FIG. 5 details the step of calculating vectors identified in FIG. 4, including a step of calculating a movement vector.

Procedures identified at step 403 for the calculation of track vectors are detailed in FIG. 5. At step 501, the next frame is loaded and at step 502, the search block 503 is identified within the frame loaded at step 501. At step 503, a movement vector is calculated and thereafter at step 504, a question is asked as to whether another frame is present within the clip. When answered in the affirmative, control is returned to step 501, resulting in a movement vector for the next frame being calculated. Eventually, when all of the frames have been considered, the question asked at step 504 will be answered in the negative, resulting in control being directed to step 404.

Figure 6:
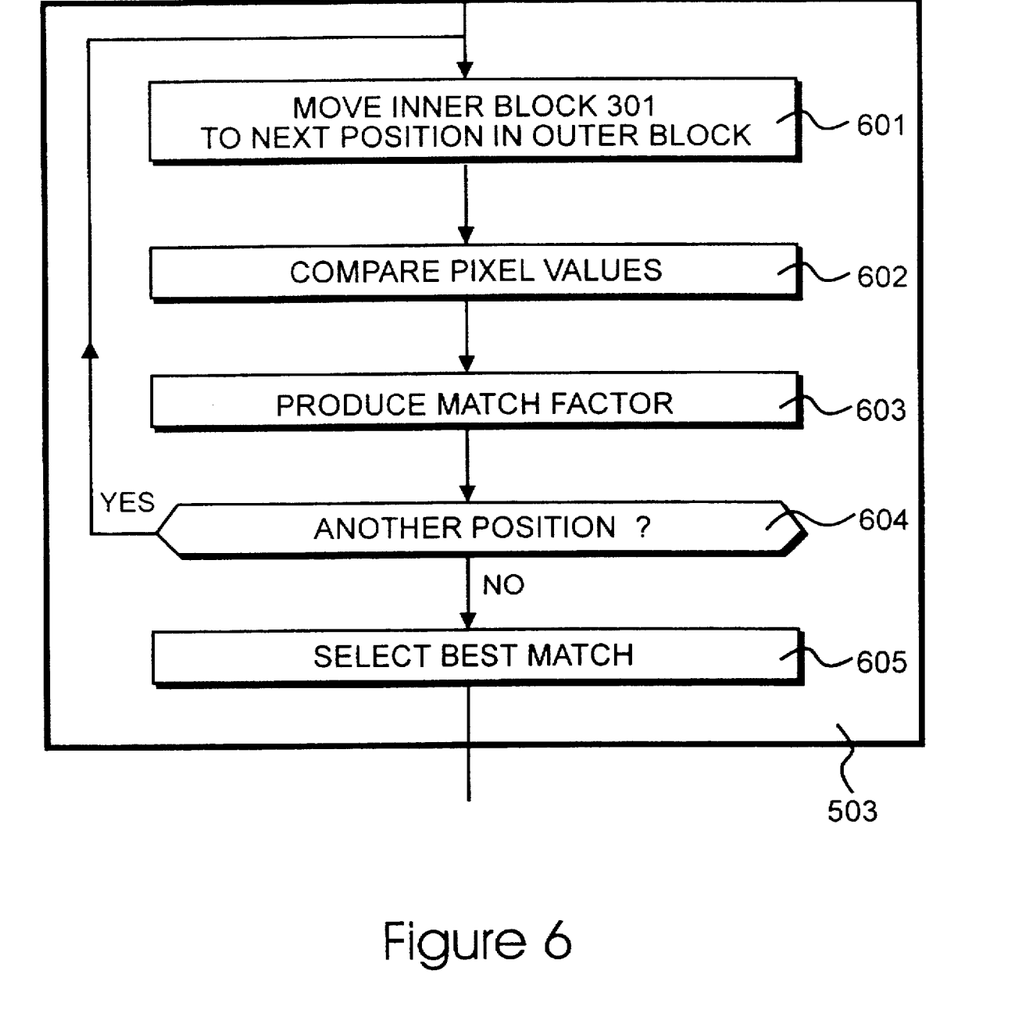
FIG. 6 details the step of calculating a section identified in FIG. 5.

Step 503, for the calculation of a movement vector, is detailed in FIG. 6. At step 601, the inner block 301 is located to the next position within the outer block 303 which, on the first iteration, would result in block 301 being located to the top left corner of block 303.

At step 602, a comparison is made of pixel values on a pixel-by-pixel basis within block 301 and, at step 603, all the resulting comparisons are combined to produce an overall match factor for the particular position of block 301 within outer block 303.

At step 604, a question is asked as to whether another position of block 301 is required and when answered in the affirmative, control is returned to step 601.

Eventually, all positions within block 303 will have been considered, resulting in the question asked at step 604 being answered in the negative, such that the control is directed to step 605. At step 605, all match factors calculated at step 603 are considered and the best match is selected. Thereafter, control is directed to step 504, so that the next frame may be considered.

Figure 7:
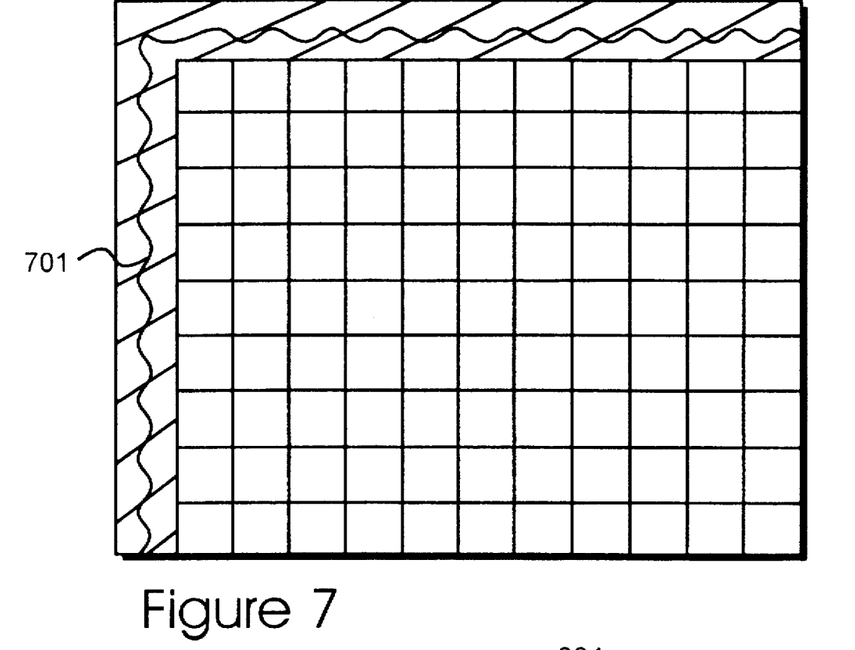
FIG. 7 illustrates a translated image frame with lost pixels.

A possible effect of moving a whole frame image with respect to its bounding frame is illustrated in FIG. 7. In this example, a movement vector has been calculated in response to a tracked object moving diagonally towards the top left corner of the image frame. This movement of the object may be stabilized, so that the position of the object remains constant with respect of the image frame, by moving the whole image frame in the opposite sense. Thus, as illustrated in FIG. 7, the overall image frame is moved towards the bottom right of the image. This movement of the whole image frame results in some of the image data being lost off screen with a corresponding blank area 701 being left to the top of the image and the left of the image. This area is filled in with a black level so as to minimise undesirable artifacts. The image may be left in this form if a final output is required in which no movement occurs. However, in the present embodiment, a modification is made to the image frame whereafter the stabilization vectors are removed. Consequently, boundary 701 is undesirable and it is also undesirable for image data to be lost.

Figure 8:
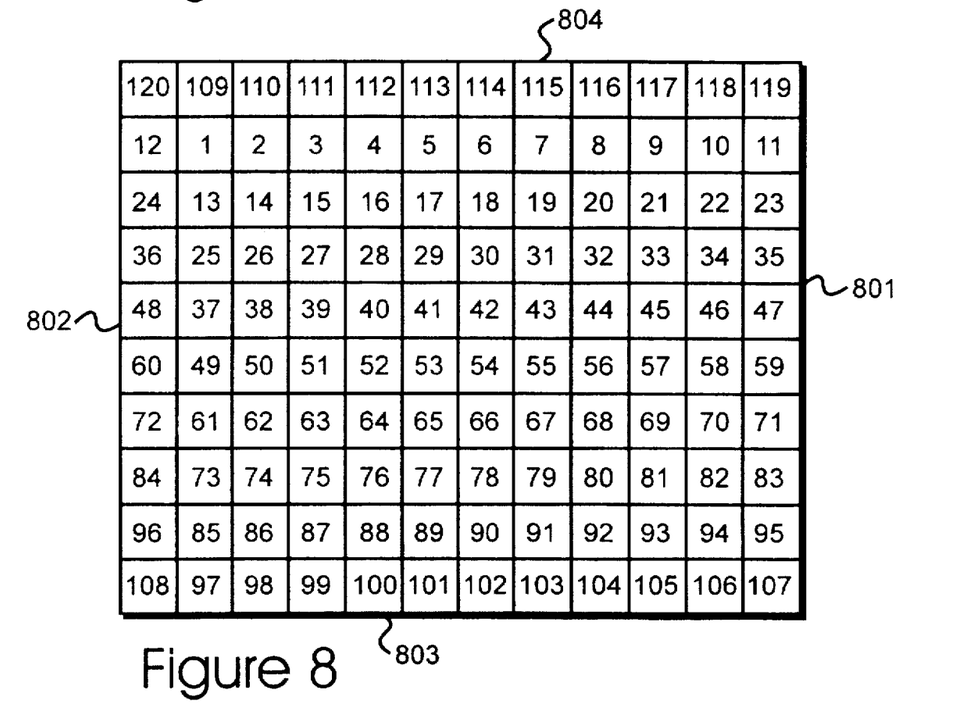
FIG. 8 illustrates a translated image frame with rolled-over pixel values.

As illustrated in FIGS. 7 and 8, the image frame has been divided into a plurality of blocks. In its non-stabilized form, these blocks are numbered starting from the top left with subsequent numbering running across from left to right and thereafter from top to bottom. The translation effected for this frame in response to the calculated movement vector effectively results in block 1 being re-positioned at a location previously occupied by block 14. Similarly, block 14 has also been relocated with similar relocations being effected for many blocks up to block 107. Thus, horizontal blocks defined by new block positions 1 to 11 and 11 to 107, as illustrated in FIG. 8, have been retained in the image frame and as such are available after the stabilization vector has been removed.

In FIG. 7, blocks 12, 24, 36, 48, 60, 72, 84, 96, 108, 120, 109, 110, 111, 112, 113, 114, 115, 116, 117, 118, 119 and 120 would have been lost. However, in the present embodiment, an image wrap has been performed such that pixels relocated from right edge 801 have been relocated to the right of the left edge 802. Thus, pixel block 48 has been wrapped around the image such that the pixel region 48 now lies next to region 37. Similarly, a vertical wrap has been performed such that pixels pushed beyond the bottom boundary 803 have been re-positioned below the top boundary 804. Thus, for example, as block 112 has been pushed below the bottom of the image, the block is repositioned above block 4 at the top of the image.

It is appreciated that the resulting image shown in FIG. 8 appears somewhat strange and it is unlikely that an image of this type would be suitable for a final output. However, having translated image frames in this way, it is possible to effect a modification to pixels which remain substantially constant in terms of their position with respect to the image frame. Thus, in the present example, it is possible for a video artist to locate the image representing the cactus, thereby creating a new composite, and to allow the composition manoeuvre to be repeated on a frame-by-frame basis. Thus, for each frame, the cactus image is included within the original object frame by a pixel modification. Thus, it is not necessary for the video artist to relocate the cactus on a frame-by-frame basis given that the image is moving in respect of the frame boundary. However, after this modification has been made, the stabilization vectors are removed such that the whole image is retained with its movement within the frame boundary being present. However, the cactus will now move coherently with other moving objects, thereby creating the illusion that the implanted image was present in the originally recorded image clip.

Although the present invention has been described hereinabove by way of preferred embodiments thereof, it can be modified, without departing from the spirit and nature of the subject invention as defined in the appended claims.

What is claimed is:

1. A method of processing image data, wherein a plurality of recorded and digitized images are replayable as a video clip, comprising the steps of:

selecting an image portion in an image frame;

tracking said selected image portion over a plurality of frames;

adjusting the position of the selected image within a frame boundary for each image frame so as to maintain the position of said selected portion substantially constant within its image frame;

repositioning portions of said image which extend beyond a frame edge to positions within its image frame;

defining a modification to a portion of an image frame;

repeating said modification over a plurality of frames; and readjusting the position of said image within the image frame.

2. A method according to claim 1, wherein said re-positioned portions are re-positioned adjacent to an opposing edge of said image frame.

3. A method according to any of claims 1 and 2, wherein said digitized images are replayed from magnetic disk storage.

4. A method according to claim 1, wherein an inner block of pixels are positioned within an outer block, pixel comparisons are made and match factors are compared to calculate a movement vector for the inner block.

5. Apparatus for processing image data, including means for replaying a plurality of digitized images as an image clip, comprising:

selecting means for selecting an image portion in an image frame;

tracking means for tracking said selected image portion over a plurality of frames;

adjusting means for adjusting the position of the selected image within a frame boundary so as to maintain the position of said selected portion substantially constant within said frame;

repositioning means for repositioning portions of said image which extend beyond a frame edge to positions within the image frame;

defining means for defining a modification to a portion of an image frame;

processing means for repeating said modification over a plurality of frames; and readjusting means for readjusting the position of said image within the image frame.

6. An apparatus for processing image data according to claim 5, wherein said repositioning means reposition said portions of said image adjacent to an opposing edge.

7. An apparatus for processing image data according to claim 5, wherein said replaying means include magnetic disk storage means.

8. An apparatus for processing image data according to claim 5, wherein said adjusting means include:

means for selecting an inner block of pixels, positioned within an outer block of pixels;

means for comparing pixels and for comparing match factors; and means for calculating a movement vector for said inner block.

* * * * *